United States Patent [19]

Emanuelli

[11] Patent Number: 4,708,542
[45] Date of Patent: Nov. 24, 1987

[54] THREADING TAP

[75] Inventor: Dino J. Emanuelli, Greenfield, Mass.

[73] Assignee: Greenfield Industries, Inc., Augusta, Ga.

[21] Appl. No.: 724,860

[22] Filed: Apr. 19, 1985

[51] Int. Cl.$^4$ .............................................. B23G 5/06
[52] U.S. Cl. .................................. 408/144; 407/119; 408/219
[58] Field of Search ............... 408/144, 145, 219, 220, 408/222; 10/141 R; 76/101 A, 101 B; 407/118, 119

[56] References Cited

U.S. PATENT DOCUMENTS

| | | | |
|---|---|---|---|
| 2,084,329 | 6/1937 | Emmons | 407/119 X |
| 4,266,449 | 5/1981 | Bielby | 76/101 A |
| 4,284,687 | 8/1981 | Dreyer et al. | 407/119 X |

OTHER PUBLICATIONS

TRW Product Bulletin No. 2301.
TRW Product Bulletin No. 2320.
Vermont Tap and Die Company advertisement.
Advertisement entitled "Emuge Gewindeschneidtechnik".

Primary Examiner—Z. R. Bilinsky
Attorney, Agent, or Firm—Dickstein, Shapiro & Morin

[57] ABSTRACT

An improved tap has a thread cutting portion over which there is a Titanium nitride coating. The Titanium nitride coating has a Rockwell C hardness of at least 70. The body portion of the tap underlying the Titanium nitride coating has a Rockwell C surface hardness of at least 65. This enables the body portion of the tap to provide a rigid support for the Titanium nitride coating. Due to the interaction between the Titanium nitride coating, the relatively hard body portion of the tap, the number of flutes and the cutting face hook angle, the number of holes which can be tapped with a straight fluted tap is increased from 114 to 1,461. On a spiral pointed type tap having a relatively hard body portion interacting with the Titanium nitride, number of flutes and cutting face hook angle, the number of holes increases from 1,662 to 4,758.

3 Claims, 11 Drawing Figures

THREADING TAP

BACKGROUND OF THE INVENTION

The present invention relates to an improved tap for cutting internal screw threads.

Uncoated taps of normal hardness of the straight fluted and spiral point types have previously been used to cut internal screw threads. It has been suggested that the uncoated taps be made with increased hardness to increase the number of holes which could be threaded by a tap before the tap becomes excessively worn. Therefore, an uncoated tap normally having a Rockwell C surface hardness of 63 was hardened to 65 Rockwell C. The higher hardness tap was then used to tap holes. Although the harder surface of the tap better resisted wear, the tap was more brittle and tended to break easier under the cutting pressures applied. Therefore, it was concluded, for most purposes at least, that a conventional tap having a Rockwell C surface hardness of 63 was superior to the tap with higher hardness for the majority of applications.

In an effort to increase the number of holes which could be threaded with a tap, the conventional tap was given a black oxide coating. The characteristics of the black oxide coating, in certain environments at least, increased the number of holes which could be threaded by the tap.

In a further effort to increase the number of holes which could be threaded with a tap, Titanium nitride coating was applied to a conventional tap, that is a tap having a hardness of 63 Rockwell C. The Titanium nitride coating increased the number of holes which could be threaded with the tap. It is believed that the Titanium nitride coating increased the life due to the relatively hard surface provided by the Titanium nitride coating. In addition, it is believed that the Titanium nitride coating has an increased lubricity quality which decreases the torque required during the cutting of threads in certain materials.

SUMMARY OF THE PRESENT INVENTION

The present invention provides for a new and improved tap for use in cutting threads in a workpiece. The tap has a thread cutting portion with flutes having teeth to cut material from the workpiece to make an internal screw thread. A coating of Titanium nitride is applied over the outer surfaces of the thread cutting portion of the tap. The Titanium nitride coating has a Rockwell C hardness of at least 70. In accordance with one of the features of the invention, the thread cutting portion of the body of the tap has a Rockwell C surface hardness of over 65. The relatively hard surface of the thread cutting portion of the tap provides a rigid support for the Titanium nitride coating. It is believed that this rigid support for the coating prevents deformation of the coating with its resulting cracking and/or spalling of the coating.

When the tap is a straight fluted type, it is preferred that the thread cutting portion have three flutes for sizes No. 0 (0.060 inches) through ½ inch. It is also preferred that the cutting faces have a negative 5 degree chordal hook.

When the tap is a spiral pointed type, it is preferred that the thread cutting portion have three flutes for sizes No. 0 (0.060 inches) through ⅜ inches. When made with 3 flutes, it is preferred that the cutting faces in the spiral point area be a tangential hook of 0 degrees. When made with 2 flutes, it is preferred that the cutting faces in the spiral point area be a positive tangential hook of 20 degrees.

It has been experimentally determined that the operating life of a tap is substantially increased by making the tap with a relatively hard body portion underlying a Titanium nitride coating, in the manner previously set forth. Thus, 1,461 holes can be tapped with a straight fluted tap having: (1) a body portion with a surface hardness of over 65 Rockwell C, (2) a Titanium nitride coating and (3) three flutes with a cutting face of 5 degrees negative chordal hook. Only 114 holes can be tapped by a standard straight fluted tap having: (1) a body portion with conventional hardness of approximately 63 Rockwell C, (2) a Titanium nitride coating, and (3) standard 4 flutes with a conventional chordal hook of approximately 1 degree positive.

Similarly, 4,757 holes can be tapped with a spiral pointed tap having: (1) a body portion with the surface hardness of over 65 Rockwell C, (2) a Titanium nitride coating, and (3) three flutes with a cutting face of 0 degrees tangential hook in the spiral point area. Only 1,662 holes can be tapped by a standard spiral pointed tap having: (1) a body portion with conventional hardness of approximately 63 Rockwell C, (2) a Titanium nitride coating, and (3) standard 2 flute with a conventional tangential hook of approximately 20 degrees.

Accordingly, it is an object of this invention to provide a new and improved tap for use in cutting threads in a workpiece and wherein the thread cutting portion of the body of the tap has a hardness of over 65 Rockwell C, and a coating of Titanium nitride and the number of flutes and the cutting face angles are as described above.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

GENERAL DESCRIPTION

Figure 1:
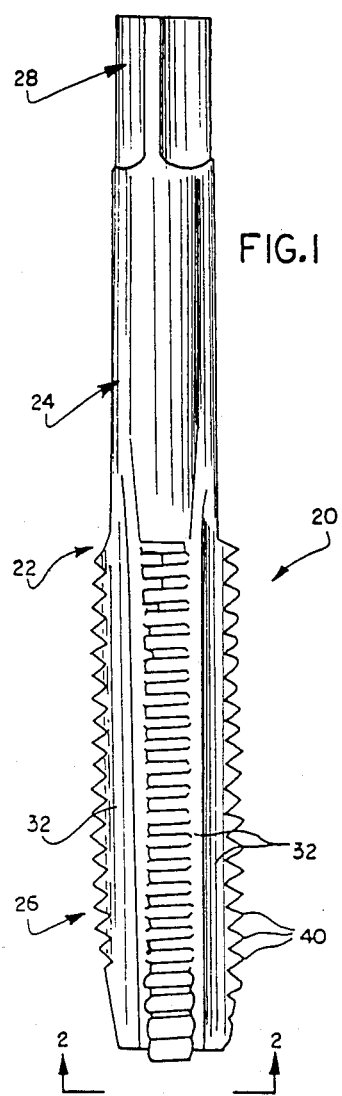
FIG. 1 is a side view of a tap, of the straight fluted type, constructed with the present invention.

An improved tap 20 constructed in accordance with the present invention is illustrated in FIG. 1 and has a generally cylindrical body 22 with a shank portion 24 and a thread cutting portion 26. The upper end (as viewed in FIG. 1) of the shank portion 24 has a square end 28 which is adapted to be engaged by a chuck or tap driver. The chuck rotates the tap 20 about its longitudinal central axis to cut threads on the inside of an opening in a workpiece.

The thread cutting portion 26 of the tap includes a plurality of lands 32 which extend longitudinally along the thread cutting portion. The lands 32 are separated by flutes 36 (FIG. 2) which provide longitudinally extending spaces to receive metal during the cutting of threads. Linear arrays of teeth 40 are on the radially outer portions of the lands 32.

A continuous coating or layer 44 (FIG. 3) of Titanium nitride is disposed over the thread cutting portion 26 of the tap. In accordance with one of the features of the invention, the Titanium nitride coating 44 is supported by hardened body portion 22 of the tap. The Titanium nitride coating 44 is very hard and has a Rockwell C hardness of at least 70. By experimentation, it has been determined that the number of holes which can be threaded with a tap is substantially increased by providing the thread cutting portion 26 with a hardness of at least 65 under the Titanium nitride coating.

Although it is difficult to be certain as to exactly why providing the thread cutting portion 26 with a hardness of at least 65 under the coating increases tap life, it is believed that the increased tap life results from the hardened body portion providing: (a) rigid support for the extremely hard Titanium nitride coating 44, (b) higher hardness provides higher hot hardness allowing to run hotter without loss of strength, and (c) provides better wear resistance in substrate when coating wears away. Thus, the thread cutting portion 26 has an outer side surface 50 which abuts an inner side surface 52 of the Titanium nitride coating. By providing the outer side surface 50 with a Rockwell C hardness of at least 65, it is believed that the outer side surface does not yield as easily and provides a more rigid base for the hard Titanium nitride coating. It is believed that the more rigid base provided by the hard surface 50 of the body 22 supports the Titanium nitride coating 44 so that the coating does not tend to crack and/or spall under the influence of concentrated loads during the cutting of a screw thread convolution.

HAND TAP

Figure 3:
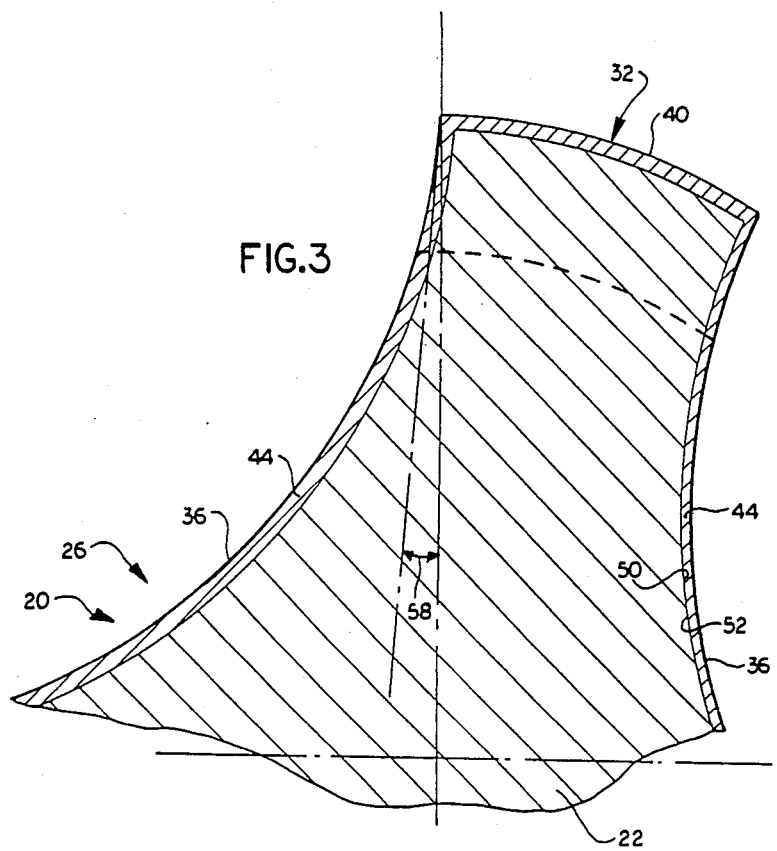
FIG. 3 is an enlarged sectional view of one of the flutes on the tap of FIGS. 1 and 2 and illustrating the relationship between a Titanium nitride coating and a body portion of the tap and illustrating the chordal hook angle of a tooth on the flutes.
Figure 2:
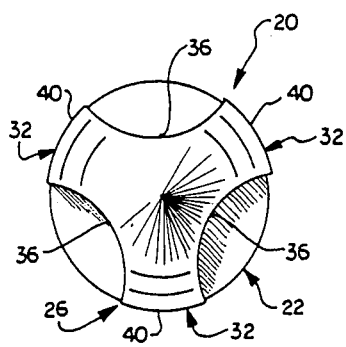
FIG. 2 is an end view, taken generally along the line 2—2 of FIG. 1, illustrating the relationship between flutes of the tap.

The straight flute tap 20 of FIGS. 1-3 is a popular style of tap for general machine tapping operations and is appropriate for many different types of materials and conditions. Although the preferred straight flute tap 20 shown in FIGS. 1-3 has three flutes 36, a standard straight flute tap generally has 4 flutes in sizes No. 8 (0.164 inches) through 1 inch. When blind holes are tapped with a straight flute tap, it is a common practice to use three different types of straight fluted taps, that is a taper tap with a chamfer length of 7 to 10 pitches, a plug tap with a chamfer length of 3 to 5 pitches, and a bottoming tap with a chamfer length of 1 to 2 pitches. Although the tap 20 of FIG. 1 is a plug tap, it should be understood that the principles of the present invention are equally applicable to taper, plug or bottoming types, or to taps with special chamfer requirements.

In addition to four flutes, a standard straight fluted tap generally has a chordal hook angle of plus one to plus six degrees. The chordal hook angle is the angle between a chord passing through the root and the crest of a thread form at the cutting face, and a radial line through the crest at the cutting edge. When the curved surface of the tooth of the tap undercuts the leading edge of the tap so that the hook angle is on the trailing side of the radial line, the hook is referred to as being positive. If the curved surface is ahead of the radial line, the hook is referred to as negative.

By experimentation, it has been determined that a larger number of holes can be tapped with a straight fluted tap 20 having: (1) a thread cutting portion 26 with a Rockwell C hardness of at least 65, (2) a Titanium nitride coating 44 with a Rockwell C hardness of at least 70, (3) three lands 32 for sizes number 0 through ½ inch and 4 or more lands for sizes over ½ inch, and (4) a 5 degree negative chordal hook angle. The 5 degree negative chordal hook angle for a tooth 40 of a tap 20 is indicated at 58 in FIG. 3.

The results of tests on straight fluted taps having a different body hardness, different numbers of flutes and chordal hook angles is shown in Table I. The tests were performed on eight batches of straight fluted taps. Each batch of taps consisted of three taps manufactured with the same characteristics. The number of holes indicated as being successfully tapped by a batch of taps corresponds to the total number of holes tapped by a batch of taps divided by three. All of the taps referred to in Table I were straight fluted taps and had a Titanium nitride coating over the outer surface of the thread cutting portion 26 of the body 22 of the tap.

TABLE I

| Batch | Number of Holes | Body-Rockwell C Hardness | Flutes | Tangential Hook Angle |
|---|---|---|---|---|
| 1 | 1,461 | 65 | 3 | −5° |
| 2 | 1,087 | 65 | 3 | +1° |
| 3 | 826 | 63 | 3 | −5° |
| 4 | 728 | 63 | 3 | +1° |
| 5 | 405 | 65 | 4 | +1° |
| 6 | 170 | 65 | 4 | −5° |
| 7 | 114 | 63 | 4 | +1° |
| 8 | 93 | 63 | 4 | −5° |

The taps of batch 7 had the standard configuration for straight fluted taps, that is four flutes and a positive one degree chordal hook angle. Each tap of batch 7 could be used on the average, to tap 114 holes before the taps failed.

The largest number of holes which could be successfully tapped, on the average, by each tap occurred for batch 1. The taps o batch 1 had: (1) a thread cuting portion with a hardness of at least 65 Rockwell C under the Titanium nitride coating, (2) three flutes for this size (10-32NF), and (3) a chordal hook angle of 5 degrees negative. The average tap of batch 1 tapped almost 13 times as many holes as the average tap having the standard configuration of batch 7. The tap 20 has the same construction as the taps of batch 1 except as noted.

From the data set forth in Table I, it is preferred to make the straight fluted tap with 3 flutes rather than the standard 4 fluted. In addition, it is preferred to make the straight fluted tap with a chordal hook angle of 5 degrees negative rather than the 1 degree positive for a standard tap.

Figure 4:
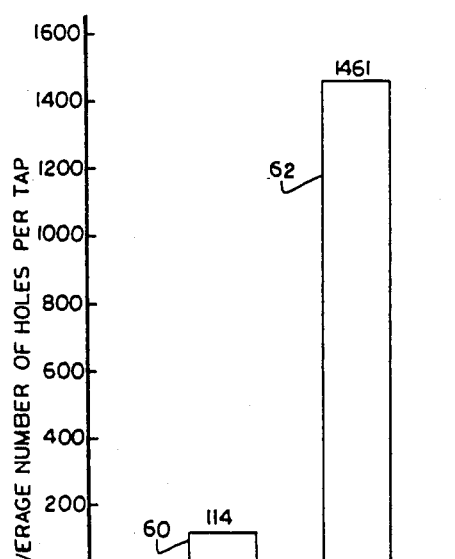
FIG. 4 is a graph comparing the number of holes which can be tapped with the standard tap having Titanium nitride coating and a tap constructed in accordance with the present invention.

A comparison of the number of holes which can be successfully tapped with a tap 20 constructed in accordance with the present invention, that is the average of batch 1, and a standard tap, that is the average tap of batch 7, is illustrated graphically in FIG. 4. The number of holes which could be tapped with the average standard tap of batch 7, that is 114, is indicated by the bar 60 in FIG. 4. The number of holes which could be tapped with the average tap 20 of batch 1, that is 1,461, is indicated by the bar 62 in FIG. 4.

It is believed that the dramatic increase in the number of holes which can be successfully tapped with the average tap 20 of the present invention is primarily the result of providing the tap with thread cutting portion 30 having a Rockwell C surface hardness of at least 65 interacting with a Titanium nitride coating having a Rockwell C hardness of at least 70 over the thread cutting portion 26 and 3 flutes with a 5 degree negative chordal hook angle. With the exception of the hardness of the thread cutting portion 26, the taps of batch 1 and batch 3 of Table I had the same construction. A comparison of the taps of batch 1 and batch 3 indicates that approximately 1.77 times as many holes can be successfully tapped with the taps of batch 1 as can be tapped with the taps of batch 3. Therefore it is believed that making the thread cutting portion 26 of the tap 20 with a Rockwell C hardness of at least 65 is important.

Although providing the thread cutting portion of the body of the tap with a Rockwell C surface hardness of at least 65 is believed to be an important factor contributing to tap life, the number of flutes provided on the tap is also important. This is shown by a comparison of the taps of batch 1 and batch 6. The only differences between these taps is that the taps of batch 1 had three flutes while the taps of batch 6 had the standard number of flutes, that is four flutes. The results establish that the taps of batch 1 could, on the average, tap almost 8.6 times as many holes as the tap of batch 6.

The chordal hook angle is also a contributing factor in determining the number of holes which can be successfully tapped. Thus, a comparison of the taps of batch 2 and the taps of batch 1 shows a substantial improvement is obtained by just changing the chordal hook angle from a positive one degree for the taps of batch 2, to a negative 5 degrees for the taps of batch 1.

By making a straight fluted tap 20 with the characteristics of the taps of batch 1, the operating life of the tap tends to be maximized. It is believed that this maximization of the tap life is due to the interaction between the hardness of the body of the tap underlying the Titanium nitride coating, the number of flutes, the chordal hook angle, and the Titanium nitride coating. The interaction of these four factors results in a tap which has a substantially improved operating life compared to a standard tap having a Titanium nitride coating, that is a tap of batch 7. Although it is believed that the combination of all four factors, hard body, three flutes, a negative 5 degree chordal hook angle and Titanium nitride coating is optimum, just providing Titanium nitride coated straight fluted taps with a thread cutting portion 26 having a Rockwell C surface hardness of at least 65 provides a substantial increase in tap life.

SPIRAL POINTED TAP

The tap of the embodiment of the invention shown in FIGS. 1 and 2 is a straight fluted tap. A spiral pointed tap constructed in accordance with the present invention is illustrated in association with FIGS. 5-8. Since the embodiment of the invention shown in FIGS. 5-8 is generally similar to the embodiment of the invention shown in FIGS. 1-4, similar numerals will be utilized to designate similar components, the suffix letter "a" being associated with the numerals of FIGS. 5-8 in order to avoid confusion.

Figure 5:
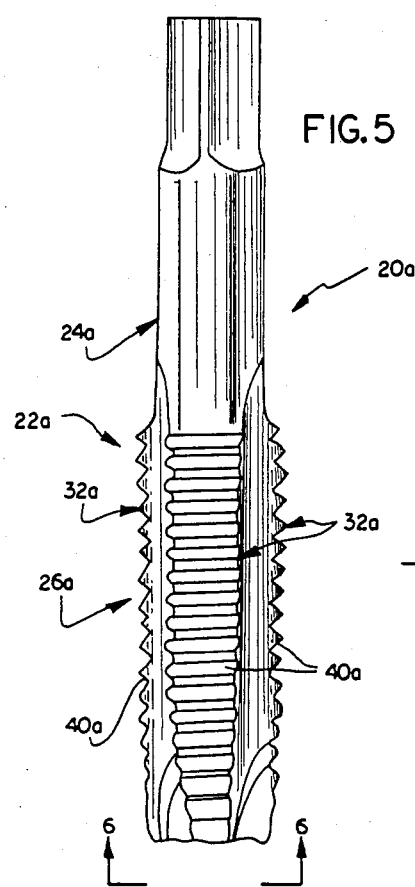
FIG. 5 is a side view illustrating a spiral pointed type tap constructed in accordance with the present invention.
Figure 7:
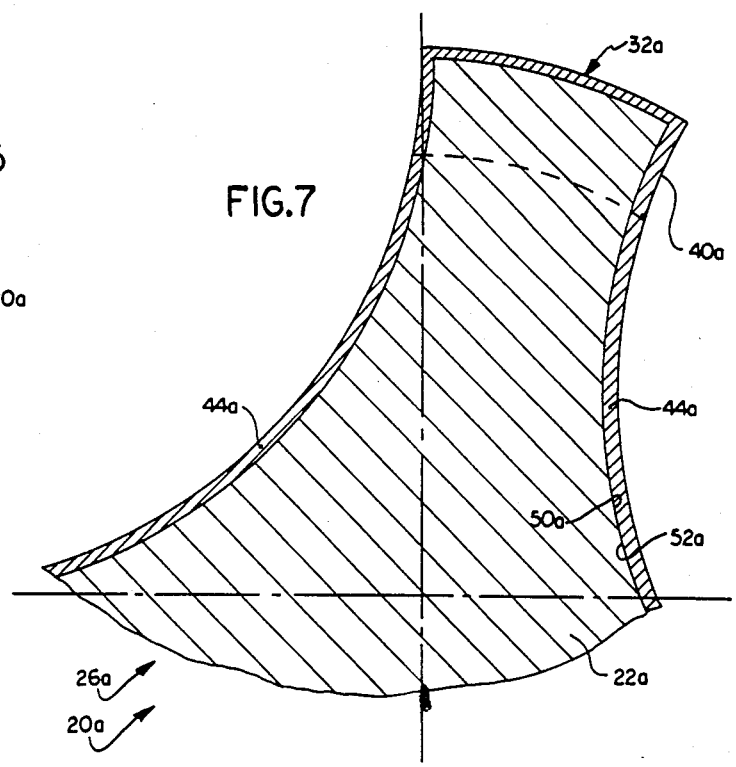
FIG. 7 is an enlarged sectional view of one of the flutes on the tap of FIGS. 5 and 6 and illustrating the relationship between a Titanium nitride coating and a body portion of the tap and illustrating the tangential hook angle of a tooth on the flute.

A spiral pointed tap 20a shoots or deflects chips ahead of the cutting action when tapping a hole (FIG. 5). This tends to reduce loading and clogging of the flutes. Since the chips are directed ahead of the cutting action, the spiral pointed tap 20a is used to tap through holes or to tap blind holes which are drilled deep enough to allow for chip accumulation.

The spiral pointed tap 20a has a body 22a with a shank portion 24a and a thread cutting portion 26a. The thread cutting portion 26a includes a plurality of elongated lands 32a having teeth 40a which cut screw threads in a hole (see FIGS. 5 and 6). The thread cutting portion 26a of the spiral pointed tap 20a is covered by a continuous coating 44a (FIG. 7) of Titanium nitride. The coating of Titanium nitride has a hardness of at least 70 Rockwell C.

The thread cutting portion 26a has a Rockwell C hardness of at least 65 to enable the thread cutting portion to provide support for the relatively brittle Titanium nitride coating. Thus, the thread cutting portion 26a has an outer side surface 50a (FIG. 7) with a Rockwell C hardness of at least 65. The outer side surface 50a of the thread cutting portion 26a abuts the inner side surface 52a of the Titanium nitride coating 44a. The Titanium nitride coating extends over all of the teeth 40a of the cutting area of the spiral pointed tap 20a.

Figure 8:
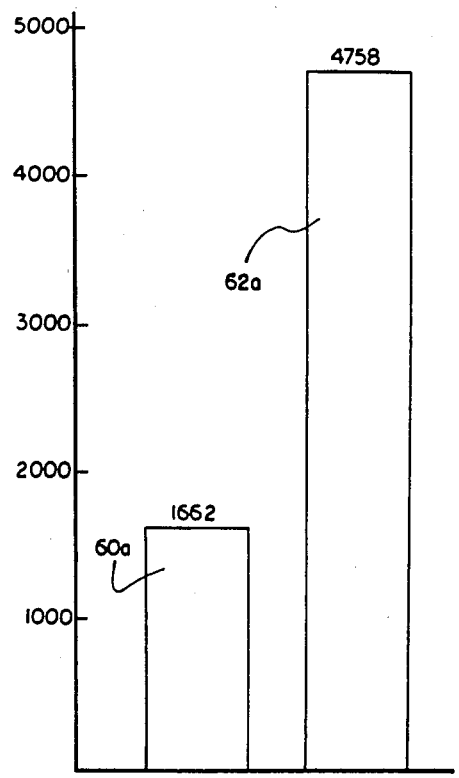
FIG. 8 is a graph comparing the number of holes which can be tapped with a standard spiral pointed tap having a Titanium nitride coating and a spiral pointed tap constructed in accordance with the present invention.

The spiral pointed tap 20a is provided with a thread cutting portion having a Rockwell C surface hardness of at least 65 and a Titanium nitride coating. It has been found that the use of three flutes with a 0 degree tangential hook angle tends to maximize tap life. The tangential hook angle is the angle between a line tangent to a hook cutting face at the cutting edge and a radial line to the same point. This maximized tap life is best seen in the graph of FIG. 8 in which a spiral pointed tap having a body portion with a Rockwell C surface hardness of at least 65, a Titanium nitride coating, three flutes and a 0 degree tangential hook angle is capable of tapping 4,758 holes before excessive tap wear occurs, as indicated by the bar 62a in FIG. 8. A standard spiral pointed tap having two flutes and a 20 degree tangential hook angle with Titanium nitride coating over a thread cutting portion having a Rockwell C surface hardness of 63 was capable of tapping only 1,662 holes before excessive wear occurred, as indicated by the bar 60a in FIG. 8.

Thus, the spiral pointed tap 20a could tap almost 2.9 times as many holes as a standard spiral pointed tap.

SPIRAL POINTED TAP—SECOND EMBODIMENT

Figure 9:
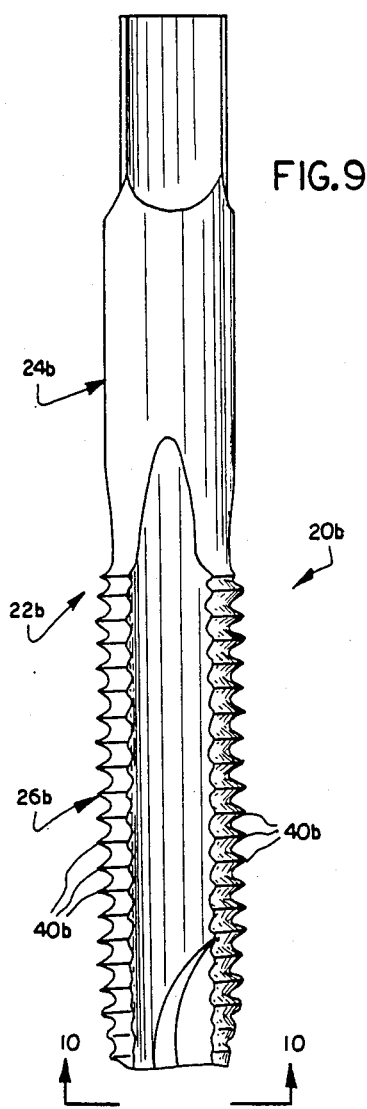
FIG. 9 is a side view of a second spiral pointed tap, constructed in accordance with the present invention.
Figure 11:
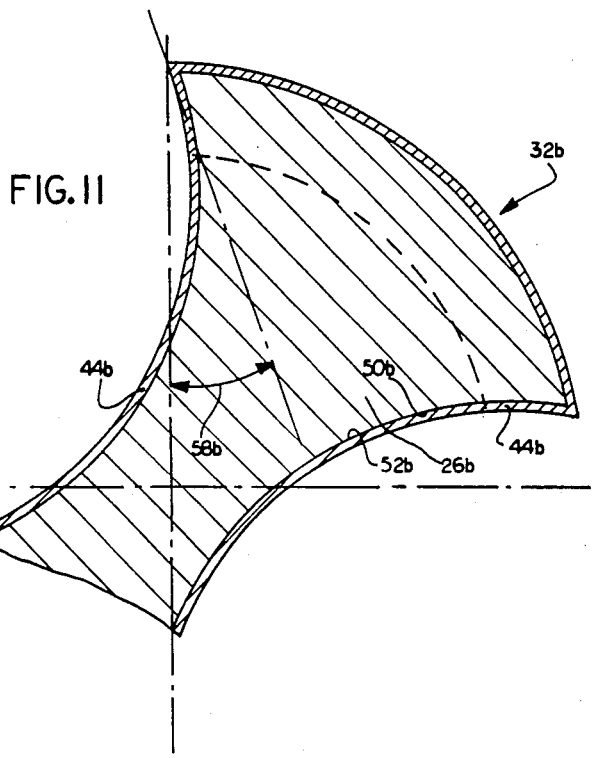
FIG. 11 is an enlarged fragmentary sectional view illustrating the relationship between a body portion of the spiral pointed tap of FIGS. 10 and 11 and a Titanium nitride coating, and illustrating the tangential hook angle of a tooth on the flute.
Figure 10:
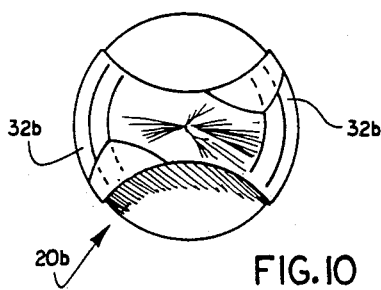
FIG. 10 is an end view, taken generally along the line 10—10 of FIG. 9, illustrating the relationship between a pair of flutes on the spiral pointed tap of FIG. 9.

The second embodiment of the spiral pointed tap is illustrated in FIGS. 9-11. Since the embodiment of the spiral pointed tap illustrated in FIGS. 9-11 is generally similar to the straight fluted taps of FIGS. 1-4 and the spiral pointed tap of FIGS. 5-8, similar numerals will be utilized to designate similar components, the suffix letter "b" being associated with the numerals of FIGS. 9-11 to avoid confusion.

Figure 6:
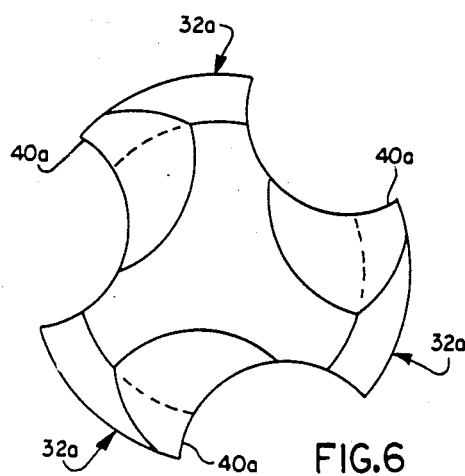
FIG. 6 is an end view, taken generally along the line 6—6 of FIG. 5 illustrating the relationship between flutes on the spiral pointed tap.

Although the three flute spiral pointed tap 20a of FIGS. 5 and 6 shows substantial improvement over a standard spiral pointed tap having two flutes and a body portion with a Rockwell C surface hardness of 63 beneath the Titanium nitride coating, the standard tap can be substantially improved by increasing the surface hardness of the body portion to a Rockwell C hardness of at least 65. The tap 20b in FIGS. 9 and 10 has a body 22b with a shank 24b and a thread cutting portion 26b. The thread cutting portion 26b includes a pair of lands 32b (see FIG. 10). The lands 32b have linear arrays of teeth 40b which cut an internal thread convolution.

In order to maximize the service life of the spiral pointed tap 20b, the thread cutting portion 26b has a Rockwell C surface hardness of 65 minimum, and is covered by a continuous coating 44b of Titanium nitride (see FIG. 11). Thus, the thread cutting portion 26b has a surface 50b with a Rockwell C hardness of at least 65. The surface 50b of the thread cutting portion 26b abuts the inner side surface 52b of the Titanium nitride coating 44b. The continuous Titanium nitride coating 44b has a Rockwell C hardness of at least 70. The teeth 40b of the tap have a tangential hook angle 58b of a positive 20 degrees.

The spiral pointed tap 40b of FIGS. 9-11 has 2 flutes and a positive 20 degree tangential hook angle, the same as a standard spiral pointed tap. However, the spiral pointed tap 20b of FIGS. 9-11 has a thread cutting portion 26b with a Rockwell C surface hardness of at least 65 to provide a rigid support for the Titanium nitride coating 44b. This substantially increases the operating life of the tap 20b.

experimentation, it has been determined that a standard spiral pointed tap having two flutes and a 20 degree tangential hook angle with Titanium nitride coating overlying a body portion having a Rockwell C surface hardness of 63 can tap 1,622 holes without excessive tap wear. However, by increasing the surface hardness in the thread cutting portion of the tap to a Rockwell C hardness of at least 65, the number of holes which can be tapped without excessive wear increases to 4,358. Thus, the tap 20b can be used to tap approximately 2.6 times as many holes as a standard tap having the same configuration and a Titanium nitride coating with the thread cutting portion having a Rockwell C surface hardness of only 63.

SUMMARY

In view of the foregoing description it is apparent that the present invention provides a new and improved tap 20, 20a or 20b for use in cutting internal screw threads in a workpiece. The tap 20, 20a or 20b has a thread cutting portion 26, 26a or 26b with lands 32, 32a or 32b having teeth to cut material from a workpiece to make a screw thread. A coating 44, 44a or 44b of Titanium nitride is disposed over the outer side surface 50, 50a or 50b of the thread cutting portion of the tap.

The Titanium nitride coating has a Rockwell C hardness of at least 70. In accordance with one of the features of the present invention, the thread cutting portion 26, 26a or 26b of the body of the tap has a Rockwell C surface hardness under the coating of at least 65. The relatively hard surface of the thread cutting portion of the tap provides a more rigid support for the Titanium nitride coating. It is believed that this more rigid support for the coating prevents deformation of the coating with the resulting cracking and/or spalling of the coating.

When the tap is of the straight fluted type (FIGS. 1-3), it is preferred that the thread cutting portion have three flutes 36 with teeth 40 having a chordal hook angle of negative 5 degrees. When the tap is of the spiral pointed type 20a, it is preferred that the thread cutting portion 26a have three flutes 36a with teeth 40 having a 0 degree tangential hook angle. However, it is contemplated that a spiral pointed type tap 20b may advantageously be made with only 2 flutes 36b having teeth 40b with a positive 20 degree tangential hook angle.

It has been experimentally determined that the operating life of the tap is substantially increased by making a tap with a relatively hard body portion underlying a Titanium nitride coating. Thus, 1,461 holes can be tapped with a straight fluted tap having: (1) a body portion with a Rockwell C surface hardness of at least 65, (2) a Titanium nitride coating 44 with a Rockwell C hardness of at least 70, and (3) three flutes 36 having teeth 40 with a negative 5 degree chordal hook angle 58 (see bar 62 of the graph in FIG. 4 and Table I). Only 114 holes can be tapped by a standard straight fluted tap having: (1) a body portion with a Rockwell C surface hardness of approximately 63, (2) a Titanium nitride coating, and (3) a standard 4 flutes having teeth with a positive one degree chordal hook angle (see bar 60 of the graph in FIG. 4 and Table I).

Similarly, 4,758 holes can be tapped with a spiral pointed tap 20a having: (1) a body portion 26a with a Rockwell C surface hardness of at least 65, (2) a Titanium nitride coating 44a with a Rockwell C hardness of at least 70, and (3) three flutes 36a having teeth with a 0 degree tangential hook angle (see bar 62a of the graph in FIG. 8). Only 1,662 holes can be tapped with a standard spiral pointed tap having: (1) a body portion with a Rockwell C surface hardness of approximately 63, (2) a Titanium nitride coating, and (3) two flutes having teeth with a positive 20 degree tangential hook angle (see bar 60a of the graph of FIG. 8).

Having described specific preferred embodiments of the invention, the following is claimed:

1. A straight fluted tap for use in cutting threads in a workpiece, said tap comprising a body having a shank portion and a thread cutting portion, said thread cutting portion of said body including three flutes having teeth for cutting material from a workpiece to make a screw thread, and a coating of titanium nitride disposed over the outer side surface of siad thead cutting portion of the body of said tap, said coating having a Rockwell C hardness of at least 70, said thread cutting portion of the body of said tap having a Rockwell C surface hardness of at least 65 to enable the thread cutting portion to provide a rigid support for the titanium nitride coating, at least some of the teeth on the thread cutting portion of said tap having a chordal hook angle in the range of a negative 9 to neative 1 degrees.

2. A spiral pointed tap for use in cutting threads in a workpiece, said tap comprising a body having a shank portion and a thread cutting portion, said thread cutting portion of said body including three flutes having teeth four cutting material fom a workpiece to make a screw thread, and a coating of titanium nitride disposed over the outer side surface of said thread cutting portion of the body of said tap, said coating having a Rockwell C hardness of at least 70, said thread cutting portion of the body of said tap having a Rockwell C surface hardness of at least 65 to enable the thread cutting portion to provide a rigid support for the titanium nitride coating, at least some of the teeth on the thread cutting portion of said tap having a tangential hook angle in the range of negative 5 degrees to positive 5 degrees.

3. A spiral pointed tap for use in cutting threads in a workpiece, said tap comprising a body having a shank portion and a thead cutting portion, said thread cutting portion of said body including two flutes having teeth for cutting material from a workpiece to make a screw thread, and a coating of titanium nitride disposed over the outer side surface of said thread cutting portion of the body of said tap, said coating having a Roekwell C hardness of at least 70 said thread cutting portion of the body of said tap having a Rockwell C surface hardness of at least 65 to enable the thread cutting portion to provide a rigid support for the titanium nitride coating, at least some of the teeth on the thread cutting portion of said tap having a tangential hook angle in the range of positvie 15 degrees to positive 25 degrees.

* * * * *